(12) United States Patent
Alakarhu

(10) Patent No.: US 11,682,219 B2
(45) Date of Patent: *Jun. 20, 2023

(54) ASYMMETRICAL LICENSE PLATE READING (ALPR) CAMERA SYSTEM

(71) Applicant: Axon Enterprise, Inc., Scottsdale, AZ (US)

(72) Inventor: Juha Alakarhu, Tampere (FI)

(73) Assignee: Axon Enterprise, Inc., Scottsdale, AZ (US)

( * ) Notice: Subject to any disclaimer, the term of this patent is extended or adjusted under 35 U.S.C. 154(b) by 186 days.

This patent is subject to a terminal disclaimer.

(21) Appl. No.: 17/339,506

(22) Filed: Jun. 4, 2021

(65) Prior Publication Data

US 2021/0295083 A1    Sep. 23, 2021

Related U.S. Application Data

(63) Continuation of application No. 16/399,607, filed on Apr. 30, 2019, now Pat. No. 11,030,472.

(51) Int. Cl.
*G06V 20/62* (2022.01)
*G06V 20/56* (2022.01)
(Continued)

(52) U.S. Cl.
CPC .............. *G06V 20/63* (2022.01); *G06V 20/56* (2022.01); *G06V 20/62* (2022.01); *G08G 1/0175* (2013.01);
(Continued)

(58) Field of Classification Search
CPC .. G06K 9/3258; G06K 9/00791; G06K 9/325; H04N 5/2327; H04N 5/2354;
(Continued)

(56) References Cited

U.S. PATENT DOCUMENTS 10,715,738 B1   7/2020 Alakarhu
2003/0155513 A1   8/2003 Remillard et al.
(Continued)

FOREIGN PATENT DOCUMENTS

JP       2013-168738 A    8/2013
KR   10-2017-0128971 A   11/2017
WO      2016-0184844 A1   11/2016

OTHER PUBLICATIONS

Jun. 2, 2021—(WO) International Preliminary Report on Patentability—Appl No. PCT/US2020/030789, 6 pages.
(Continued)

*Primary Examiner* — Asghar H Bilgrami
(74) *Attorney, Agent, or Firm* — Banner & Witcoff, Ltd.

(57) ABSTRACT

A system and method is disclosed for capturing images of one or more moving vehicles (i.e., a target vehicle) from another moving vehicle (i.e., subject vehicle). The disclosed system dynamically adjusts illumination power, exposure times, and/or other settings to optimize image capture that takes into account distance and speed. By optimizing for distances and moving vehicles, the disclosed system improves the probability of capturing a legible, usable photographic image. In one example, the disclosed system may be incorporated into an asymmetric license plate reading (ALPR) system.

20 Claims, 13 Drawing Sheets

(51) Int. Cl.
    *G08G 1/017* (2006.01)
    *G08G 1/052* (2006.01)
    *G08G 1/04* (2006.01)
    *H04N 23/74* (2023.01)
    *H04N 23/68* (2023.01)
    *H04N 23/72* (2023.01)
    *H04N 23/56* (2023.01)
    *H04N 23/661* (2023.01)

(52) U.S. Cl.
    CPC ............... *G08G 1/04* (2013.01); *G08G 1/052* (2013.01); *H04N 23/56* (2023.01); *H04N 23/661* (2023.01); *H04N 23/684* (2023.01); *H04N 23/72* (2023.01); *H04N 23/74* (2023.01); *G06V 20/625* (2022.01)

(58) Field of Classification Search
    CPC ...... H04N 23/56; H04N 23/661; H04N 23/72; G08G 1/0175; G08G 1/052; G08G 1/04; G06V 20/62
    See application file for complete search history.

(56) References Cited

U.S. PATENT DOCUMENTS

| | | |
|---|---|---|
| 2007/0147055 A1 | 6/2007 | Komatsu |
| 2007/0211928 A1 | 9/2007 | Weng et al. |
| 2008/0100225 A1 | 5/2008 | Fujie |
| 2008/0181461 A1* | 7/2008 | Saito ............... G06K 9/00825 382/104 |
| 2009/0225189 A1 | 9/2009 | Morin |
| 2011/0240701 A1 | 10/2011 | Totani et al. |
| 2012/0105639 A1 | 5/2012 | Stein et al. |
| 2013/0105853 A1* | 5/2013 | Kneissl ............... H01L 33/483 257/99 |
| 2013/0163822 A1 | 6/2013 | Chigos et al. |
| 2014/0347511 A1* | 11/2014 | Rodriguez-Serrano ............... G06K 9/00825 348/222.1 |
| 2015/0002732 A1* | 1/2015 | Hjelmstrom ......... H04N 5/2353 348/362 |
| 2015/0222812 A1 | 8/2015 | Murray et al. |
| 2015/0350510 A1* | 12/2015 | Han ..................... H04N 5/2354 348/229.1 |
| 2016/0350601 A1* | 12/2016 | Grau ..................... G06T 11/60 |
| 2017/0041591 A1 | 2/2017 | Korogi et al. |
| 2017/0177963 A1* | 6/2017 | Pavelka ................. G02B 5/12 |
| 2017/0334340 A1 | 11/2017 | Madril et al. |
| 2018/0297511 A1 | 10/2018 | Park et al. |
| 2019/0004149 A1* | 1/2019 | Mano ..................... G01S 7/484 |
| 2019/0129011 A1* | 5/2019 | Ruffo ................... G01S 17/894 |
| 2019/0315271 A1 | 10/2019 | Tatara et al. |
| 2020/0122645 A1* | 4/2020 | Tsai ...................... H04N 5/235 |

OTHER PUBLICATIONS

Apr. 14, 2022—U.S. Notice of Allowance—U.S. Appl. No. 17/607,286.
May 19, 2022—(EP) European Search Report—Appl No. PCT/US2020/030789.
D1 Cui Yuntao et al: "Extracting characters of license plates from video sequences", Machine Vision and Applications., vol. 10, No. 5-6, Apr. 1, 1998 (Apr. 1, 1998), pp. 308-320, XP055918011, DE ISSN: 0932-8092, DOI: 10.1007/s001380050081, Retrieved from the Internet: <URL:https://link.springer.com/content/pdf/10.1007/s001380050081.pdf>.
D2 Anonymous: "Image registration—Wikipedia", Mar. 6, 2019 (Mar. 6, 2019), XP055917810, Retrieved from the Internet: <URL:https://en.wikipedia.org/w/index.php?title=Image_registration&oldid=886389582> [retrieved on May 3, 2022].
D3 Anonymous: "Automatic number-plate recognition—Wikipedia", Apr. 29, 2019 (Apr. 29, 2019), XP055918268, Retrieved from the Internet: <URL:URL:https://en.wikipedia.org/w/index.php?title=Image_registration&oldid=886389582> [retrieved on May 4, 2022].
May 6, 2022—(EP) European Search Report of EP 20798459.
File History of U.S. Appl. No. 16/399,654, filed Apr. 30, 2019.
Sep. 11, 2020—(WO) International Search Report and Written Opinion—Appl No. PCT/US2020/030789, 16 pages.

* cited by examiner

ASYMMETRICAL LICENSE PLATE READING (ALPR) CAMERA SYSTEM

CROSS-REFERENCE TO RELATED APPLICATION

This application is a continuation of U.S. patent application Ser. No. 16/399,607, filed Apr. 30, 2019, which is hereby incorporated by reference in its entirety.

BACKGROUND

Video and still cameras affixed to stationary structures are sometimes used for purposes of security surveillance. In a stationary installation, the camera is typically in an environment with known external variables (e.g., environmental, lighting, field of view) that are generally constant or readily apparent. In such an environment, basic cameras with minimal enhancements might suffice.

Meanwhile, in police cars, taxis, crowdsourced ride-sharing vehicles, and even personal vehicles, cameras mounted on a dashboard are sometimes used for purposes of recording the environment in the immediate proximity of the vehicle. However, in a vehicle moving at high speeds, the capabilities of a traditional camera to capture video and still images can sometimes be compromised. Moreover, external variables can sometimes further negatively impact the ability for the camera to capture sharp, useful images.

With respect to lighting conditions, some security cameras include features to improve recordability in low-light scenarios and night time. In the case of a stationary camera installation, a separate light source with a daylight sensor and/or clock setting might be installed in the area to illuminate in low-light scenarios or at night. Moreover, some separate light sources might emit light in the infrared spectrum range to enhance recordability at night without necessarily illuminating the environment with visible light.

Furthermore, some cars are equipped with adjustable headlights that rotate to optimize for illuminating the path of a car as it is being driven around a corner. The headlights emit visible light to illuminate the lane in front of the car so that the driver can see where she is driving. Consequently, these headlights result in an illumination pattern that is focused on the front of the car. These headlights do not take into account whether the car is being driven in a country where cars drive on the right side or the left side of the road. Moreover, for obvious reasons, the light emitted by these headlights is visible to the driver and falls into the range of the frequency spectrum for visible light. Such headlights do not typically and intentionally emit light in the non-visible spectrum.

Numerous novel and nonobvious features are disclosed herein for addressing one or more of the aforementioned shortcoming in the art.

BRIEF SUMMARY

In light of the foregoing background, the following presents a simplified summary of the present disclosure in order to provide a basic understanding of some aspects of the embodiments disclosed herein. This summary is not an extensive overview of the invention. It is not intended to identify key or critical elements of the invention or to delineate the scope of the invention. The following summary merely presents some concepts of the invention in a simplified form as a prelude to the more detailed description provided below.

In one example, one or more computer programs can be configured to perform particular operations or actions by virtue of including instructions that, when executed by data processing apparatus, cause the apparatus to perform the actions. One general aspect includes a light emitting apparatus mountable to a transportation vehicle, the apparatus including: a body. The light emitting apparatus also includes a camera. The light emitting apparatus also includes a light source including a plurality of light emitting diodes configured to emit light. The light emitting apparatus also includes a micro-controller communicatively coupled to the light source and the camera, where the micro-controller is configured to dynamically adjust at least illumination power of the light source and exposure time of the camera. The light emitting apparatus also includes where the light emitted by the plurality of light emitting diodes creates an asymmetrical illumination cone pattern towards a lane near to one on which the transportation vehicle is traveling. Other embodiments of this aspect include corresponding computer systems, apparatus, and computer programs recorded on one or more computer storage devices, each configured to perform the actions of the methods.

Implementations may include one or more of the following features. The apparatus where the light source is configured to emit light in an infrared frequency range. The apparatus where the dynamically adjusting of the illumination power of the light source and the exposure time of the camera occurs at a pre-defined interval of time. The apparatus where the dynamically adjusting of the illumination power of the light source and the exposure time of the camera occurs repeatedly through a range of combinations of illumination power and exposure times. The apparatus where the dynamically adjusting of the illumination power of the light source and the exposure time of the camera occurs repeatedly through a range of combinations of illumination power and exposure times without communicating with at least one of a distance measurement component and a speed delta measurement component. The apparatus where the distance measurement component and the speed measurement component include a processor and a memory that store a plurality of images captured with the camera, where the speed measurement component compares the plurality of captured images to determine a distance change over a period of time. Implementations of the described techniques may include hardware, a method or process, or computer software on a computer-accessible medium.

One general aspect includes a method for generating an enhanced illumination pattern from a light emitting apparatus mounted to a subject vehicle while it is traveling, the method including: measuring, by the light emitting apparatus, an approximate distance to a target vehicle in a lane near one on which the subject vehicle is traveling. The method also includes calculating, by the light emitting apparatus, a relative speed of the target vehicle in the lane relative to a speed of the subject vehicle in its own lane. The method also includes inputting the approximate distance to and the relative speed of the target vehicle into a micro-controller in the light emitting apparatus. The method also includes based on the received inputs, adjusting, by the micro-controller, one or more settings of a camera communicatively coupled to the light emitting apparatus. The method also includes based on the received inputs, sending, by the micro-controller, an illumination command to a light source in the light emitting apparatus corresponding to one of a low, medium, or high illumination. The method also includes sending a plurality of images captured by the camera while operating with different settings and under different illuminations to a processor for selection of an optimal image. Other embodiments of this aspect include corresponding computer systems, apparatus, and computer programs recorded on one or more computer storage devices, each configured to perform the actions of the methods.

Implementations may include one or more of the following features. The method where the one or more settings of the camera include shutter speed, iso, auto-focus, and ultra-violet filter. The method where the light emitted by the light source is in an infrared frequency range. The method where the generating by micro-controller of the illumination command includes: outputting a medium value for the illumination command when the relative speed is below a threshold speed and the approximate distance is above a threshold distance. The method may also include outputting a medium value for the illumination command when the relative speed is above a threshold speed and the approximate distance is below a threshold distance. The method may also include outputting a high value for the illumination command when the relative speed is above a threshold speed and the approximate distance is above a threshold distance. The method may also include outputting a low value for the illumination command when the relative speed is below a threshold speed and the approximate distance is below a threshold distance. Implementations of the described techniques may include hardware, a method or process, or computer software on a computer-accessible medium.

One general aspect includes a light emitting apparatus mountable to a transportation vehicle, the apparatus including: a body. The light emitting apparatus also includes a camera. The light emitting apparatus also includes a light source including a plurality of light emitting diodes (LEDs) oriented in a grid pattern inside the body and configured to emit light in an infrared frequency range. The light emitting apparatus also includes a micro-controller communicatively coupled to the light source and the camera, where the micro-controller is configured to dynamically adjust at least illumination power of the light source and exposure time of the camera through a rotating list of combinations of illumination power and exposure times. The light emitting apparatus also includes where the light emitted by the plurality of LEDs creates an illumination pattern towards a lane near to the one on which the vehicle travels. Other embodiments of this aspect include corresponding computer systems, apparatus, and computer programs recorded on one or more computer storage devices, each configured to perform the actions of the methods.

The methods and systems of the above-referenced embodiments may also include other additional elements, steps, computer-executable instructions or computer-readable data structures. In this regard, other embodiments are disclosed and claimed herein as well. The details of these and other embodiments of the present invention are set forth in the accompanying drawings and the description below. Other features and advantages of the invention will be apparent from the description, drawings, and claims.

BRIEF DESCRIPTION OF FIGURES

The present invention is illustrated by way of example, and is not limited by, the accompanying figures in which like reference numerals indicate similar elements and in which.

DETAILED DESCRIPTION

In accordance with various aspects of the disclosure, computerized methods, systems, devices, and apparatuses are disclosed that capture images of one or more moving vehicles (i.e., a target vehicle) from another moving vehicle (i.e., subject vehicle). Aspects of the disclosed system improve over the art because, inter alia, it dynamically adjusts illumination power, exposure times, and/or other settings to optimize image capture that takes into account distance and speed. Nevertheless, some embodiments disclosed herein include examples where distance and/or speed are not considered in adjusting the settings.

In one example, the disclosed system may be incorporated into an asymmetric license plate reading (ALPR) system. For example, by optimizing for distances and moving vehicles—the disclosed system improves the probability of capturing a legible, usable photographic image of a target vehicle's license plate (or other information such as an image of a driver and/or passengers in a vehicle). Moreover, aspects of the disclosed system improve the camera's ability to capture objects and license plates at farther distances (e.g., more than 20-30 feet away) than existing technology.

Figure 1:
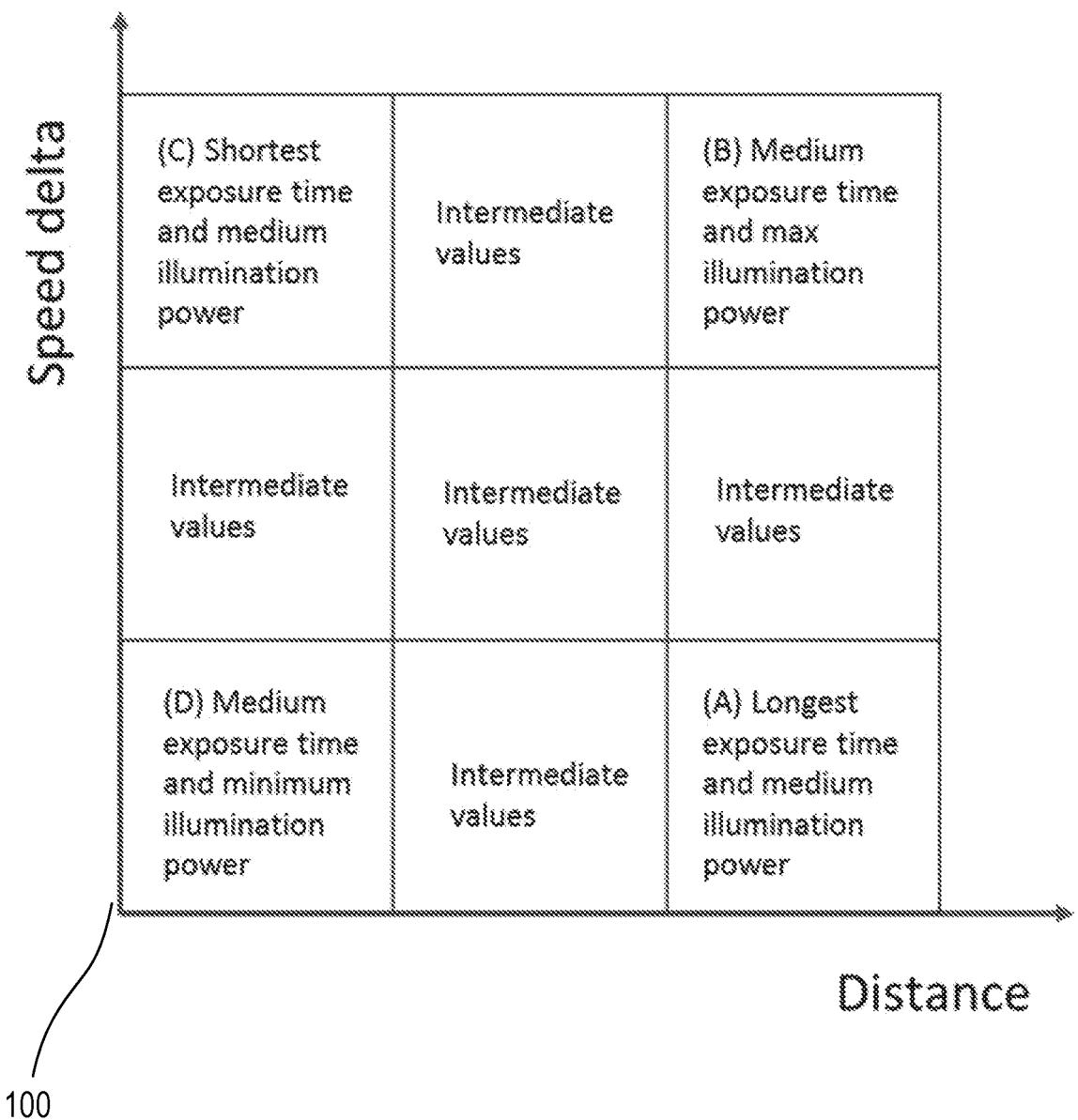
FIG. 1 depicts illustrative operational settings based on a relationship between speed delta and distance in accordance with one or more examples embodiments.

FIG. 1 depicts the relationship 100 between speed delta values (represented by the Y-axis) and distance values (represented by the X-axis) as the define the operation of an exemplary embodiment of the disclosed system. The components of the system may include, in some embodiments, a camera apparatus, a light emitting apparatus, a networked computer communicatively connected via a wireless network with components in the camera apparatus, and/or a vehicle include its telematics sensors, on-board diagnostics (OBD) port, and other components. These interconnected components may coordinate to determine the speed delta value and distance values for any given image capture.

Figure 8:
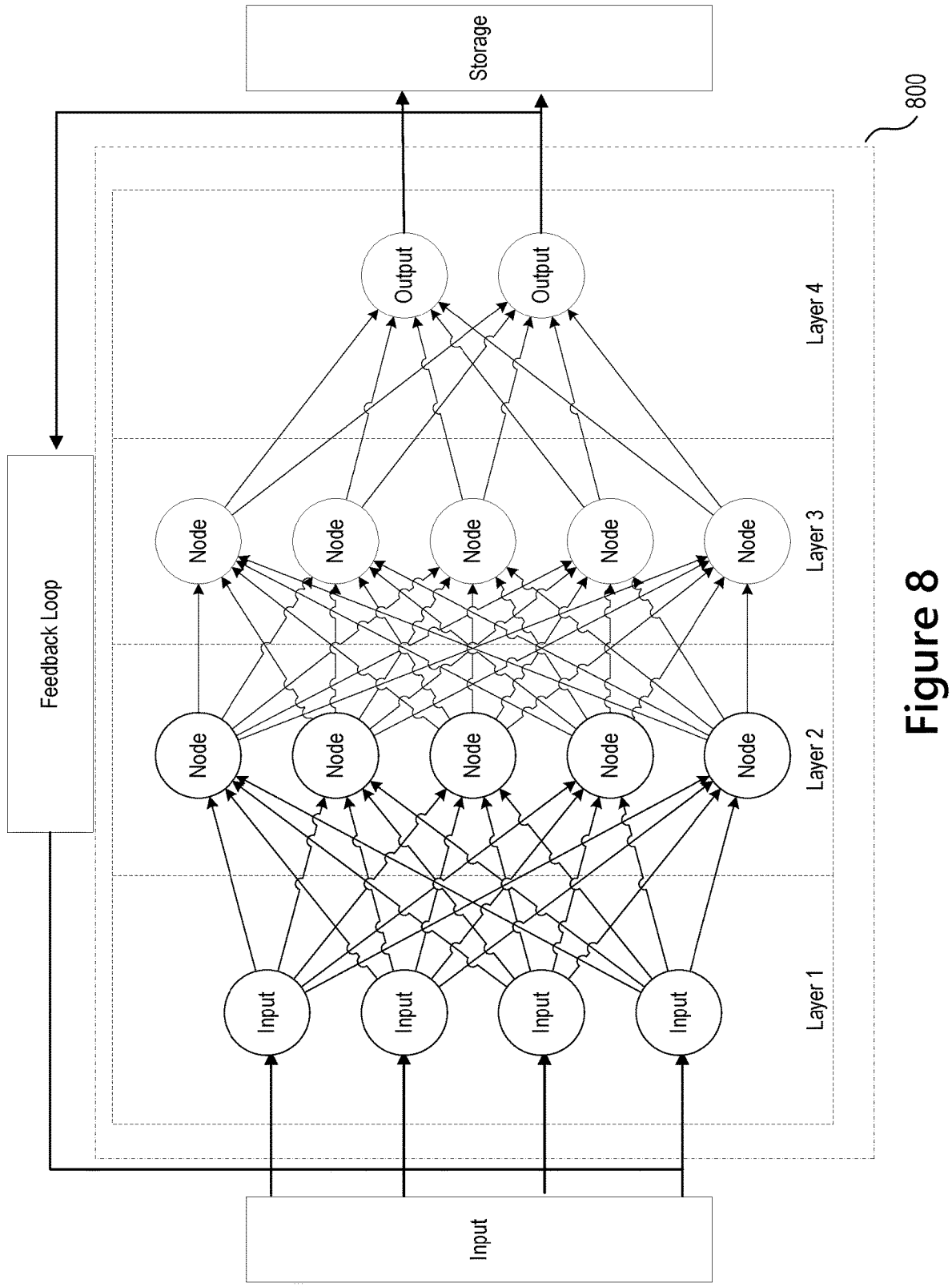
FIG. 8 illustrates an example of artificial intelligence methods that may be implemented in accordance with one or more example embodiments.

As the graph 100 illustrates, the autonomous operation of the system may be programmed to operate under the scenarios described in FIG. 1. The components of the system provide one or more of the inputs required by graph 100. In some examples, the intermediate value may be a fixed, pre-set value. In other examples, the system may operate a feedback loop, as illustrated in FIG. 8 to regularly update the intermediate value to optimize the operation of the system. Meanwhile, software, firmware, or hardware at the vehicle onto which the camera assembly is mounted, may control the settings in accordance with FIG. 1. In some examples, the camera assembly may simply include a computer-executable code that executes on a processor in the camera assembly.

Some illustrative settings of the camera assembly include, but are not limited to, exposure time, illumination power, focus position, sensor gain (e.g., camera ISO speed), aperture size, filters, and the like. In graph 100, values for the exposure time and illumination power are illustrated for different operating scenarios. Scenarios A, B, C, and D illustrated in counter-clockwise direction in the graph 100 starting on the lower-right, will be described in more detail in relation to FIG. 3A. A person of skill in the art will appreciate that one or more of the settings may be interrelated or dependant. For example, an exposure of 1/25 sec at f/11, ISO 100 is equivalent to an exposure of 1/400 sec at f/2.8, ISO 100. In other words, because the shutter speed has been reduced by four stops, this means less light is being captured by the image sensor in the camera assembly. As a result, the aperture is increased in size by four stops to allow more light into the camera assembly. While there are benefits and disadvantages to adjusting the settings in one way versus another, such knowledge would fall within the realm of a person having skill in the art. For example, a person having skill in the art would understand that to maximize exposure, a camera assembly might be set to a large aperture, 6400 ISO, and a slow shutter speed. Meanwhile, to minimize exposure, a camera assembly would be set to a small aperture, 100 ISO, and a fast shutter speed. Of course, the sharpness of the captured image might be effected by depth of field, aperture, and shutter speed settings. In particular, with most embodiments disclosed herein involving a moving subject vehicle capture an image of a moving target vehicle, the ability to capture an image without introducing blurriness or shading or planar warp is a consideration.

Figure 2A:
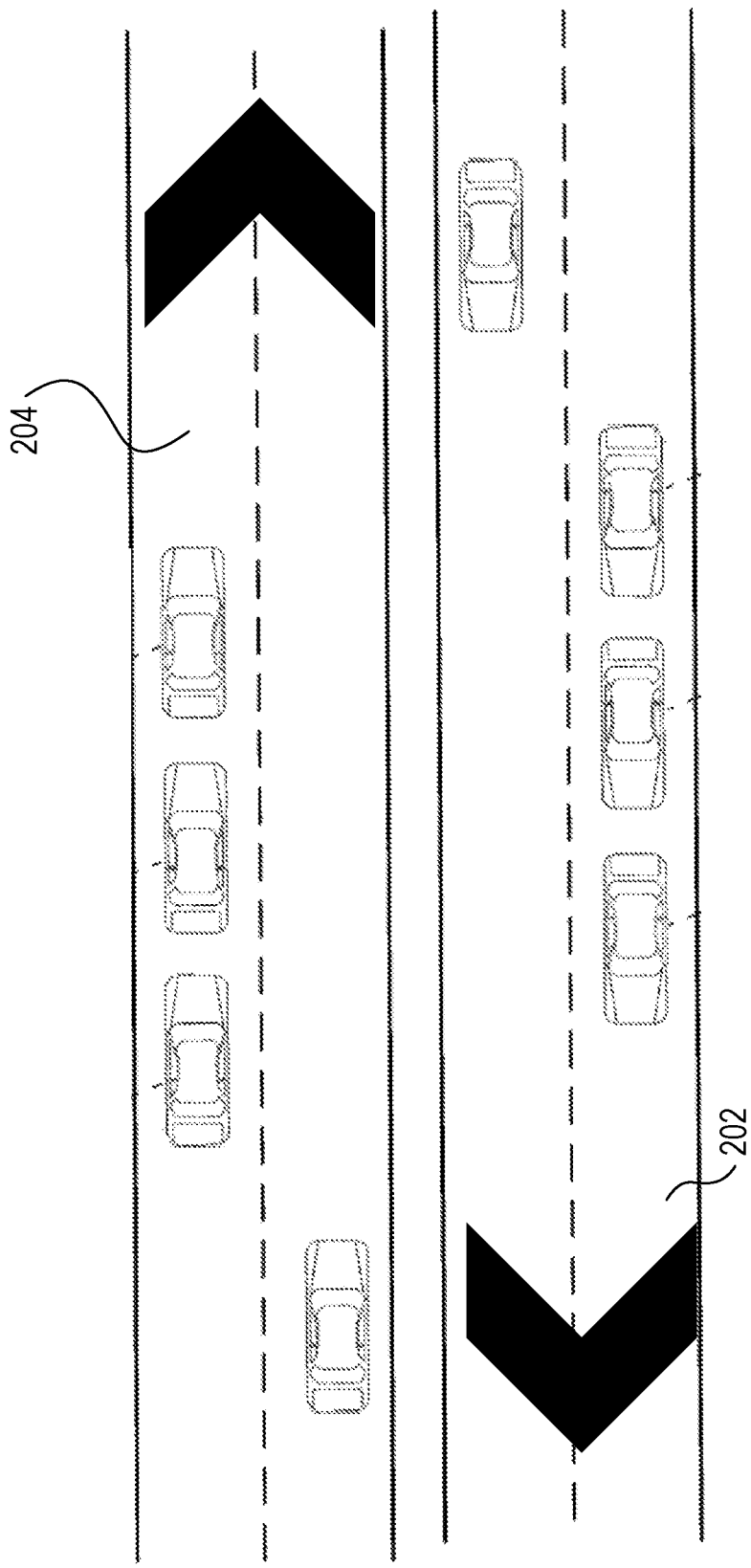
FIG. 2A and FIG. 2B illustrate an illustrative roadway on which subject vehicles and target vehicles may be traveling while the subject vehicle is operating in accordance with one or more examples embodiments.

Moreover, in practice, target vehicles (e.g., oncoming traffic) on a roadway 202 traveling in a direction opposite to a subject vehicle on the roadway 204 may be traveling at different speeds and be at different distances, as illustrated in FIG. 2A. Meanwhile, the continuous flow of new target vehicles on the roadway 202 (e.g., oncoming traffic and following traffic) adds complexity to image capture. The optimum value for camera settings for each scenario is a non-linear function which depends on the camera performance parameters and detection algorithms. Meanwhile, in practice, a relationship such as depicted in FIG. 1, may provide images of sufficient quality to capture objects and license plate numbers.

Figure 2B:
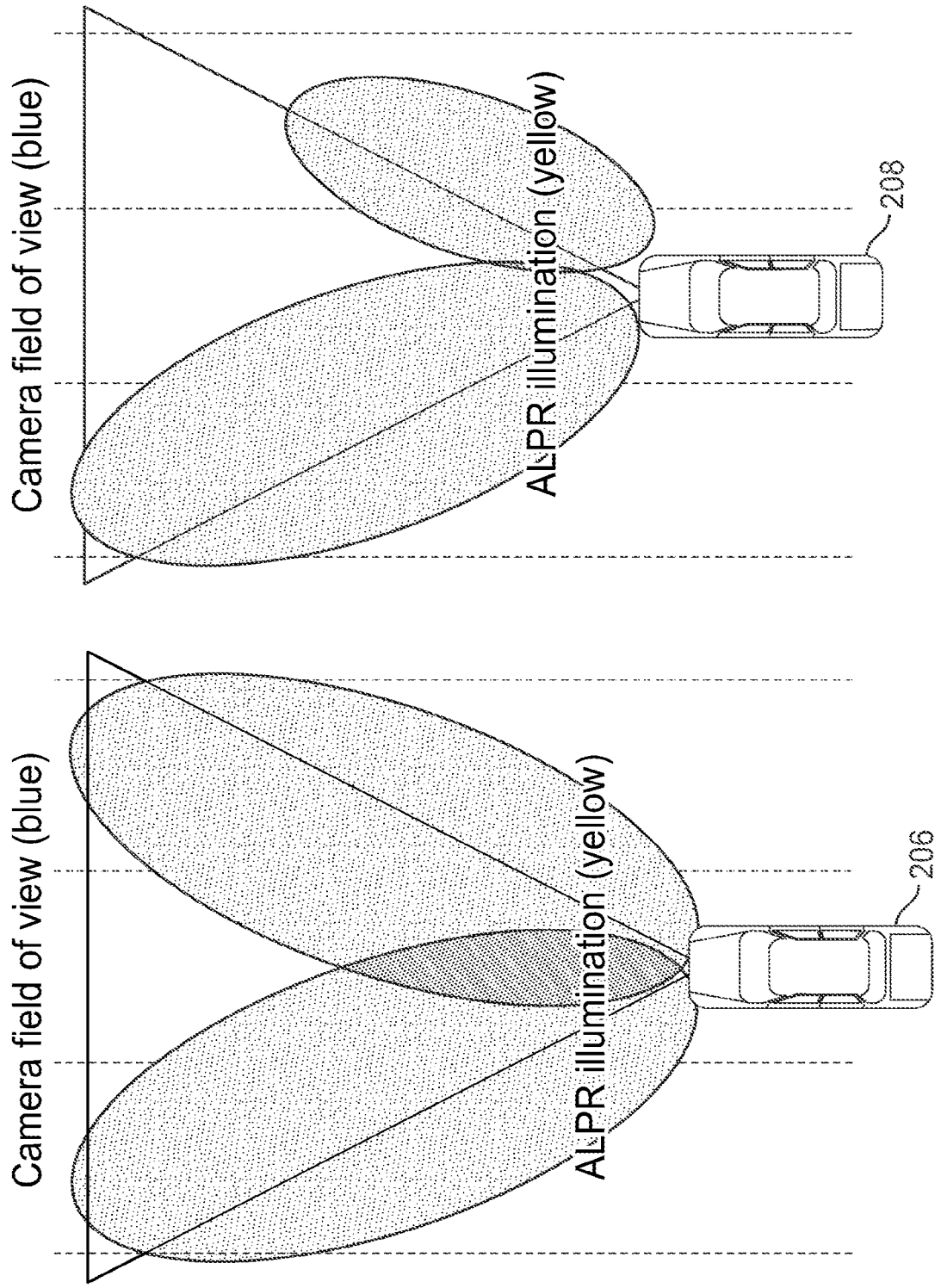

In addition to optimizing camera settings, the disclosed system contemplates a light emitting apparatus 400 coupled to the operation of a camera apparatus 300 to further optimize image capture. FIG. 2B illustrates one example of an asymmetrical illumination pattern created by the light emitting apparatus. In contrast, the illumination pattern 208 in a different example embodiment has been further optimized so that most intensive illumination is optimized to the edges of the camera field of view. Meanwhile, the illumination straight ahead of the camera field of view is reduced. Further optimization of the asymmetric illumination cone 208 may be performed to strengthen the illumination on the left-hand side lane, in the United States, because the oncoming traffic is there. Adding extra illumination in that direction enhances image capture because the relative velocity is higher and requires stronger lighting. Meanwhile, in scenarios such as FIG. 2A, which corresponds to roadways in countries like the Britain and India, the oncoming traffic is on the right-hand side lane; thus, the configuration set for the implementation would be reversed for those countries. In yet another example, the illumination cone may be a single illumination cone pointing in the same direction as the camera, however, such an example has not been fully optimized for image capture. This is because the cone of the illumination and the camera field of view point to the same direction; this approach is not optimal in some embodiments because it illuminates the lane in front of the car the best instead of the adjacent lanes In some examples, the light emitted by the disclosed system may be adjusted to further refine the illumination cone 208. In one example, the light emitting apparatus 400 may comprise a plurality of light emitting diodes (LED) oriented in a grid pattern. Each LED may be coupled to a mounting apparatus that allows each individual LED to be re-oriented as desired by the system. For example, each LED may be separately attached to a motorized mechanism (or other mechanism) to allow the system to roll, pitch, and/or yaw the LED as appropriate. In some examples, a group of LEDs may be attached to a single mounting apparatus, thus they may all re-orient in unison. The grouping of LEDs may be by column, by row, or by an area of the grid. Moreover, some LEDs may be tilted in one direction, but others are tilted in a different direction. Thus, the illumination pattern may be tailored and tested to identify an optimal configuration in particular geographic locations and environments. In yet another example, the plurality of LEDs in the light emitting apparatus may be individually controlled. For example, one or more LEDs may be sub-grouped and activated or deactivated together so as to emit an illumination pattern where the strongest light is pointed to the edge of the camera field of view 206. As used in this example, activated and deactivated includes not only turning on and turning off an LED, but also dimming the illumination intensity of an LED. Alternatively, the illumination pattern may be such that the strongest light is directed to oncoming traffic 208. The aforementioned sub-groups may be static, non-movable LEDs without a mounting apparatus to effectuate tilting; alternatively, the mounting apparatus and sub-group activation/deactivation feature may be used together. The sub-groups may be a plurality of LEDs in a single row or single column, or may be another other pattern of LEDs (e.g., diagonal line, circular pattern, semi-circular pattern, elliptical pattern, or other pattern).

Figure 4A:
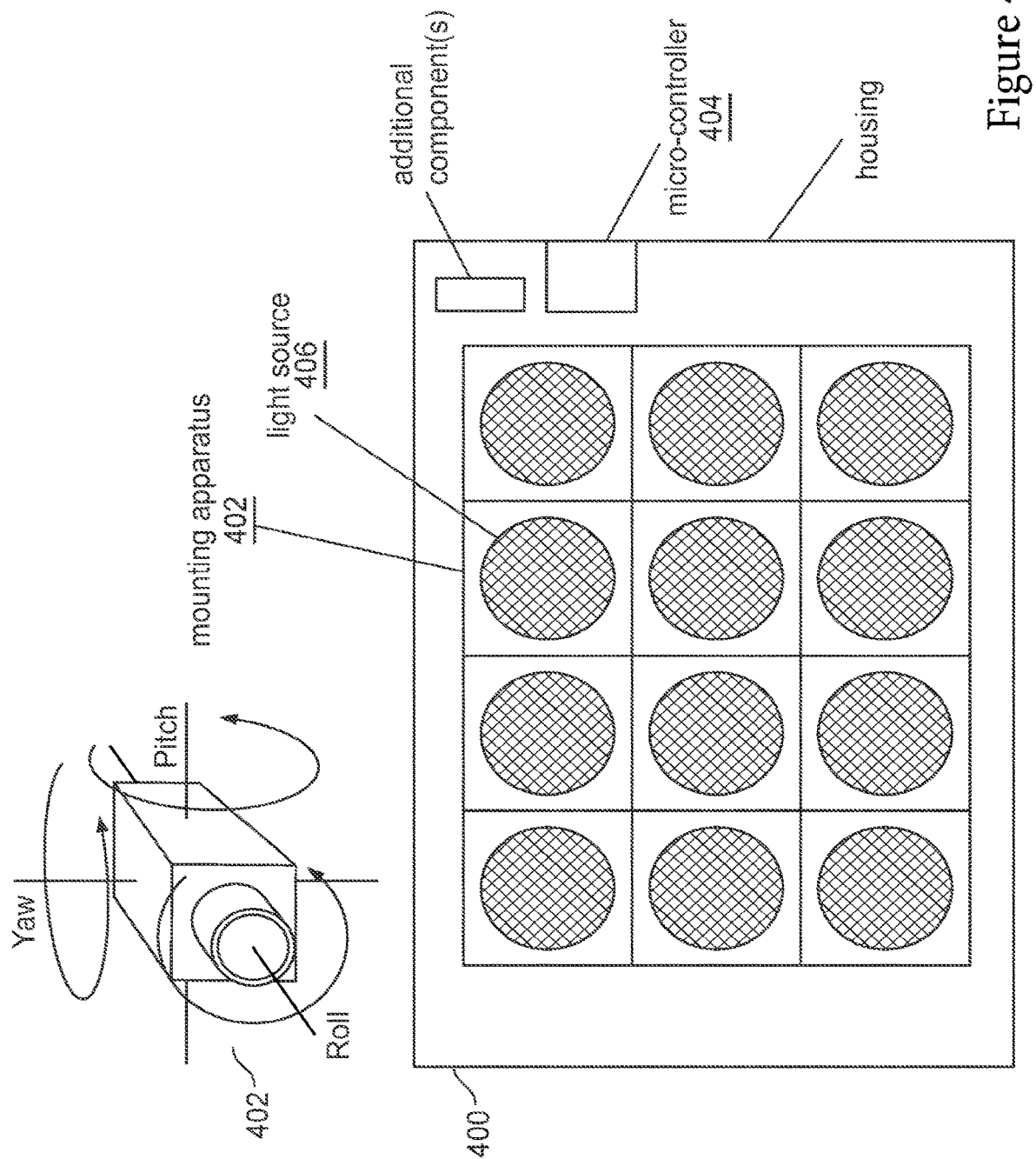
FIG. 4A, FIG. 4B, and FIG. 4C are illustrative light emitting apparatuses in accordance with one or more example embodiments.

Although the grid pattern 400 in FIG. 4A is illustrated as a rectangular arrangement, the configuration of light sources (e.g., LEDs) in a grid is not limited to such arrangements. The grid may be a circular grid, elliptical grid, or any other shape conducive to generation of an illumination pattern. The mounting apparatus may operate in response to electrical signal received from a micro-controller or other external source. As a result, the light emitting apparatus 400 may generate a customized illumination cone as desired. Although LEDs are used as one example of a light source, other types of lighting elements, such as halogen bulbs and the like are contemplated for use with the system. LEDs, however, may be preferred due to their fast response time and ability to be switched on and off at a high frequency without substantially impacting bulb life. In some examples, the LEDs and other light sources may emit light in the infrared frequency range to aid in image capture in low-light or night time situations. Another benefit of infrared light is that it is non-visible to the eye, thus has a less negative impact on operators of target vehicles in oncoming traffic.

Figure 3A:
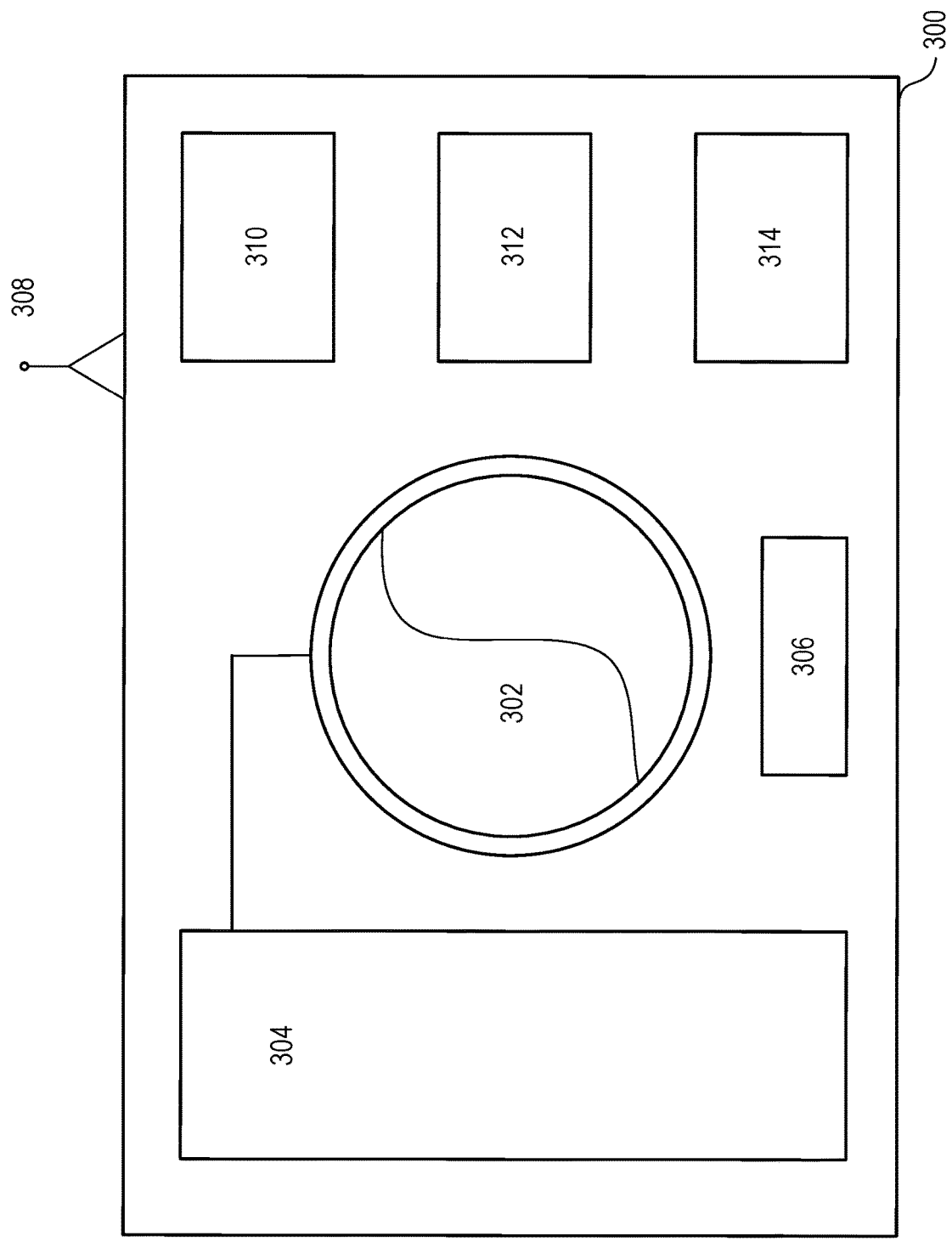
FIG. 3A and FIG. 3B show illustrative camera apparatuses with several technical components in accordance with one or more examples embodiments.

FIG. 3A illustrates a camera apparatus enhanced with various aspects of the disclosed system. The camera apparatus 300 may include one or more components to assist in enhancing image capture of a moving, target vehicle. In particular, a micro-controller 304 may be incorporated with the camera apparatus 300 to automatically adjust settings. The micro-controller 304 may adjust settings such as, but not limited to, exposure time, illumination power, focus position, sensor gain (camera ISO speed), aperture size, filters/UV, image-noise filtering, and the like.

Elaborating upon the examples provided with the aid of FIG. 1, the micro-controller 304 may receive inputs of speed delta and distance, and adjust the settings of exposure time and illumination power according to various scenarios 100 identified. For example, in scenario (A) in the lower right-corner of the graph 100, the target vehicles with small speed delta (compared to the subject vehicle) but with maximum recognition distance, cause the micro-controller 304 to set the camera to use the longest exposure times and medium illumination power. The longer exposure time is optimal because the angular movement is minimized due to long distance and small speed delta. Due to the long exposure time, the illumination power does not need to be the highest possible, even when the target vehicle is at far distance. Example values are 4 (millisecond and 0.5 W illumination power, respectively.

In another example, in scenario B in the upper right-corner of the graph 100, the target vehicles is at a long distance with large speed delta need medium exposure time because the speed delta pushes it shorter, but long distance pushes it longer. These target vehicles need the highest illumination power available to compensate for the shorter exposure time compared to scenario A. The micro-controller 304 may also increase gain, in some examples, than in scenario A if the illumination power reserve is running out. Example values are 2 millisecond and 1 W illumination power, respectively.

In yet another example, in scenario C in the upper left-corner of the graph 100, the target vehicle is at a short distance and a high speed delta creates the highest angular speed in the camera view. Therefore, the micro-controller 304 sets the exposure time to be very short, (e.g., only 0.1 milliseconds). As a result, the shutter covering the image sensor 302 may open its lens for only a very short time. As the target vehicles are close in distance and the power of the illumination is proportional to the inverse of the distance squared, the illumination power can be in the medium level, such as 0.25 W illumination power.

Finally, in another example, in scenario D in the lower left-corner of the graph 100, the target vehicle is at a short distance with a small speed delta. Thus, the micro-controller 304 sets a medium exposure time, similar to its operation in scenario B. The illumination power can also be set to a minimum due to the short distance (similar to scenario C), but longer exposure time, e.g., 0.05 W. Coincidentally, static LED illumination cone optimization (see FIG. 2B) supports this behaviour—vehicles expected to need lower illumination (e.g., scenarios A and D) have a lower power illumination cone.

Referring to FIG. 3A, in some examples, the camera apparatus 300 may be integrated with a light source 306 for emitting infrared light, or light in a different frequency spectrum. In alternate embodiments, a light emitting apparatus 400 may be physically separate from the camera apparatus 301. In such embodiments, the micro-controller 304 in the camera apparatus communicates with the micro-controller in the light emitting apparatus 400. For example, if the camera apparatus 301 is equipped with components to detect and measure the delta speed value and distance value of a target vehicle, then its micro-controller 304 may share this information with the light emitting apparatus 400 for efficiency. The apparatuses may share information wirelessly using antenna and wireless circuitry 308. The wireless circuitry 308 may support high-speed short-range communication to permit fast communication between the apparatuses. The wireless circuitry 308 may also include long-range communication hardware to permit connection to a remote server computer or cloud devices.

In addition to efficiency, the sharing of information between the devices furthers the synchronization of the apparatuses 301, 400 for purposes of capturing a higher quality image. For example, if the camera apparatus 301 relies on the light emitting apparatus 400 to provide a pulse of infrared light at the moment of, or just immediately prior to, the shutter 302 on the camera apparatus 301 opening, the two apparatus must communication and synchronize. In one example, to aid in synchronization, inter alia, the camera assembly may operate a pre-defined sequence of configuration settings at pre-defined intervals. The system may cycle through a set of scenarios (e.g., scenarios A-D in FIG. 1) to test the quality of image capture with each scenario. Meanwhile, multiple settings may be used without requiring the separate apparatus to synchronize each time—rather, the separate apparatus might synchronize just at the start of the pre-defined script. Once the script begins execution, each apparatus performs its part to completion.

Light source 306 (or light emitting apparatus 400) provides functionality to the overall system because it provides the illumination pattern for improving image capture quality. As such, the synchronization or alignment of the light emitting apparatus 400 and the camera apparatus 300 is important. In one example, an LED pulse and camera exposure time are aligned to capture numerous images with varying configuration settings. For example, first, the micro-controller 304 uses the most powerful led pulse available and longer exposure time. This is good for catching target vehicles at longer distances (because a lot of light is needed and also the angular velocity is smaller so the longer exposure time is acceptable). Then on the next frame, the micro-controller 304 uses medium exposure time and illumination pulse power. This is useful for catching target vehicles at medium distance. Next, the micro-controller 304 may set a very short exposure time and also the lowest power led pulse to catch the closest vehicles. Then the cycle may start again with the longest exposure time and highest power pulse. By adjusting both the exposure time and pulse power, the system is optimized for "inversely proportional to the square of the distance" characteristics of these systems. The illumination intensity is inversely proportional to the square of distance between the light source and target vehicle's license plate. This makes the exposure very difficult—if the target car is slightly too far away, the license plate may be too dark to see, and if the car is slightly too close, the license plate may be too bright to see (i.e., overexposed).

Referring to FIG. 3A, the camera apparatus 300 may also include memory 310, a GPS unit 312, and a processor 314. The memory 310 is a suitable device configured to store data for access by a processor, controller, or other computer component. The memory 310 may include non-volatile memory (e.g., flash memory), volatile memory (e.g. RAM memory), or a hybrid form of computer-readable medium for data storage. Moreover, the memory 310 may include one or more cache memories for high-speed access. In rapid operation, a camera apparatus 300 may capture multiple images in a matter of seconds. Multiple levels of cache memory may be used to ensure efficient execution. The memory 310 may closely operate with the processor 314.

For example, the processor may include an image processor to analyze images captured by the apparatus 300 to determine if the image is sufficiently legible or if the image data can be immediately discarded. At least one benefit of an image processor operating nearly simultaneously with image capture is reduced memory usage due to immediate discarding of useless or empty images.

In one example of technological efficiencies of the system, the image captured by the image sensor 302 may be stored in memory 310 and then sent to processor 314 to detect the vehicle license plate number of the target vehicle in the image. The vehicle license plate number may then be compared against a database of license plate numbers (or other information) associated with possible legal-related issues. In some embodiments, the vehicle license plate number (and other information) may be sent over a network to a remote server in the cloud that stores a database of license plate numbers. If a concern is identified, the operator of the subject vehicle may be alerted either audibly, visually, or through vibrations.

In addition, the camera apparatus 300 may include a GPS unit 312 to capture the location of the camera apparatus 300 at the instant an image is captured. In addition to location, the GPS unit or other component in the camera apparatus may time-stamp the capture of the image. Location and time data may then be embedded, or otherwise securely integrated, into the image to authenticate the capture of the photograph. Once the image is securely stamped with location and date/time, the image may, in some example, be securely transmitted to a cloud server for storage. In some examples, the image may be stored in an evidence management system provided as a cloud-based service.

In addition to location-stamping the image, the GPS unit 312 may also be used to enhance image capture. In one example, the speed of the subject vehicle may be obtained from the GPS unit 312 or from the OBD port of the subject vehicle. The vehicle speed and/or the longitude-latitude data from the GPS unit 312, may allow the micro-controller to predict whether the subject vehicle is on a rural highway or other street. The speed of the subject vehicle effects the quality of the images captured because the angular velocity for close target vehicles will be too high. Therefore, the system becomes trained about which settings are optimal for the scenario. For example, the GPS unit 312 may detect if the subject vehicle is traveling in a city, suburb, or rural area, and adjust the settings in adherence.

In addition to location-stamping the image, the GPS unit 312 may also be used to enhance image capture. In one example, the system may remember particular configuration settings at a particular geographic location, and the micro-controller 304 may re-use the prior ideal configuration settings at that location. For example, a particular stretch of highway might have an impenetrable row of trees that renders the system futile for a duration of time. During that time, the system may halt image capture if the system is primarily being used in an ALPR application. Rather than collect image data and consume limited memory 310 on the camera apparatus 300, the system uses historical data to learn and improve the operation of the system with a feedback loop.

Figure 3B:
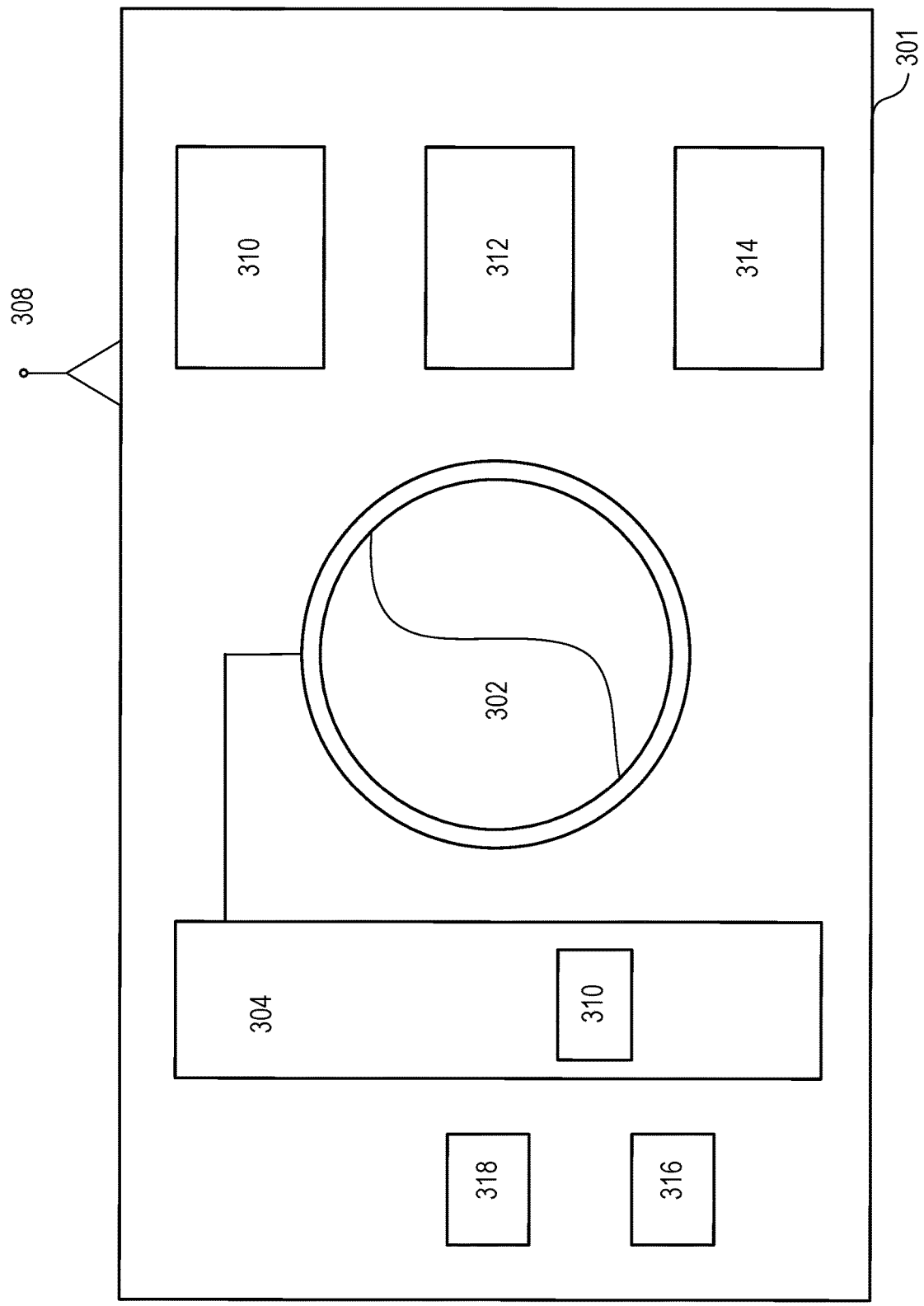

Referring to FIG. 3B, the camera apparatus 301 may include and/or omit one or more components in some embodiments. For example, the LED 306 may be omitted in some embodiments of the camera apparatus 301. Instead, the light emitting apparatus may be external to the camera apparatus 301 and operate in a synchronized manner with the camera apparatus 301. Furthermore, the camera apparatus 301 may include additional components 318, such as a stabilizer, optical zoom hardware, cache memory, interface to a vehicle's on-board diagnostics (OBD) port, multi-axis accelerometer, a motion sensor, and components 316 configured to use artificial intelligence (AI) to perform operations. For example a AI model may be trained and stored in memory on the camera apparatus 301 to assist the AI component 316 to use a feedback loop to adjust and refine its settings and operation. The AI component 316 may include a GPU for processing machine learning and deep learning calculations with efficiency and speed. As illustrated in FIG. 8, a neural network 800 executing in the GPU can provide valuable feedback as the system is trained with real image captures.

Furthermore, in a networked, crowdsourced arrangement, the camera assembly system may be installed on multiple, subject vehicles operating in a particular geographic area to provide broader coverage. The plurality of camera apparatuses on different vehicles may cooperate with each other by sharing information over a wireless connection. The camera apparatus in a first subject vehicle may be operated in conjunction with global satellites or other location tracking system. A second subject vehicle with a camera assembly system may share information either directly with, or via a cloud server, the first subject vehicle. The sharing of information may allow the training of the AI component 316 with greater efficiency.

Referring to FIG. 4A, a standalone light emitting apparatus 400 is illustrated. The light emitting apparatus 400 may include a micro-controller 404, similar to the one in the camera apparatus 300, for controlling configuration settings of the light emitting apparatus 400. The light emitting apparatus 400 provides functionality to the system because it generates and emits the illumination pattern that improves image capture quality. The light emitting apparatus 400 may be mounted to a vehicle such as a police car, motorcycle, or other vehicle. The apparatus 400 may be mounted inside the vehicle, or may be securely mounted to the outside of the vehicle. The light emitting apparatus 400 comprises a body, at least one light source 406, a mounting apparatus 402 inside the body that couples the light source to the body, and a micro-controller 404. As illustrated in FIG. 4A, the mounting apparatus 402 may be coupled with the light source 406 such that it permits the micro-controller to automatically, and without human intervention, tilt the light source along at least one of its roll, pitch, and yaw axes. In some examples, the mounting apparatus might allow adjustment in all three axes in response to a tilt command from the micro-controller 404. The end result of the tilting and re-orienting of the light sources is an asymmetrical illumination cone pattern being emitted towards a lane near the one on which the subject vehicle is traveling. The target vehicle's lane need not necessarily be adjacent to the subject vehicle's lane. Rather, the system may be trained to adapt to different road configurations in different geographic areas.

In addition to tilt commands, the micro-controller 404 may also generate and send illumination commands to the light source 406. The light source may be further configured to emit light at one of a low, medium, and high illumination in response to an illumination command. Illumination commands are not limited by the enumerated list provided here. Rather, illumination commands may include any denotation of varying illumination levels.

Whether a light emitting apparatus 400 will emit low, medium, or high illumination is based on the values generated by the distance measurement component and the speed delta measurement component. In one example, the distance measurement component and the speed measurement component may share a laser beam generator positioned in the body. The laser beam generator is configured to emit a laser beam to measure the approximate distance to the target vehicle and the relative speed of the target vehicle. Such measurements are then sent to the micro-controller 404 for rapid decision making. In an alternate embodiment, an external device may provide tilt commands and illumination commands through an externa port interface in the light emitting apparatus 400.

Figure 4B:
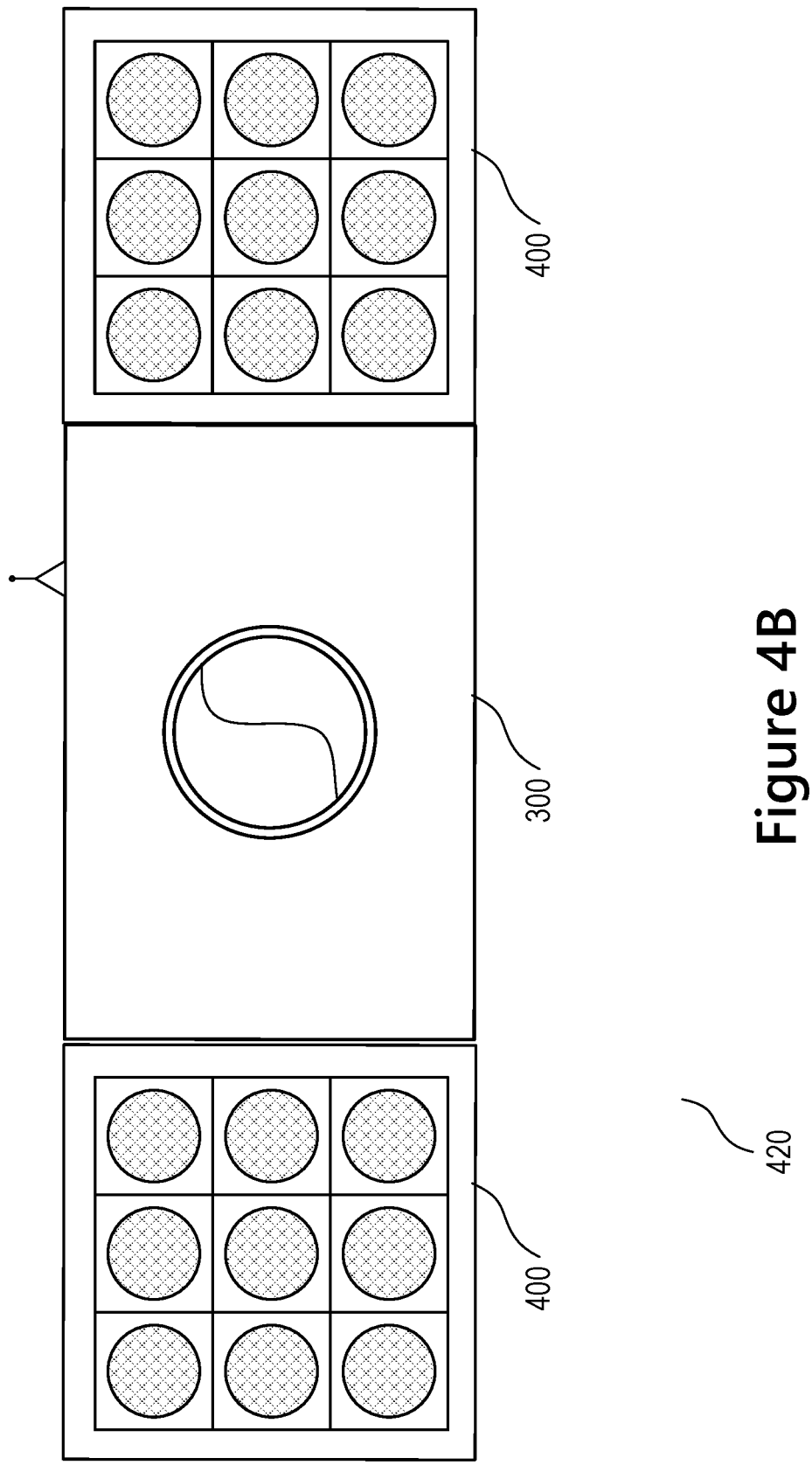
Figure 4C:
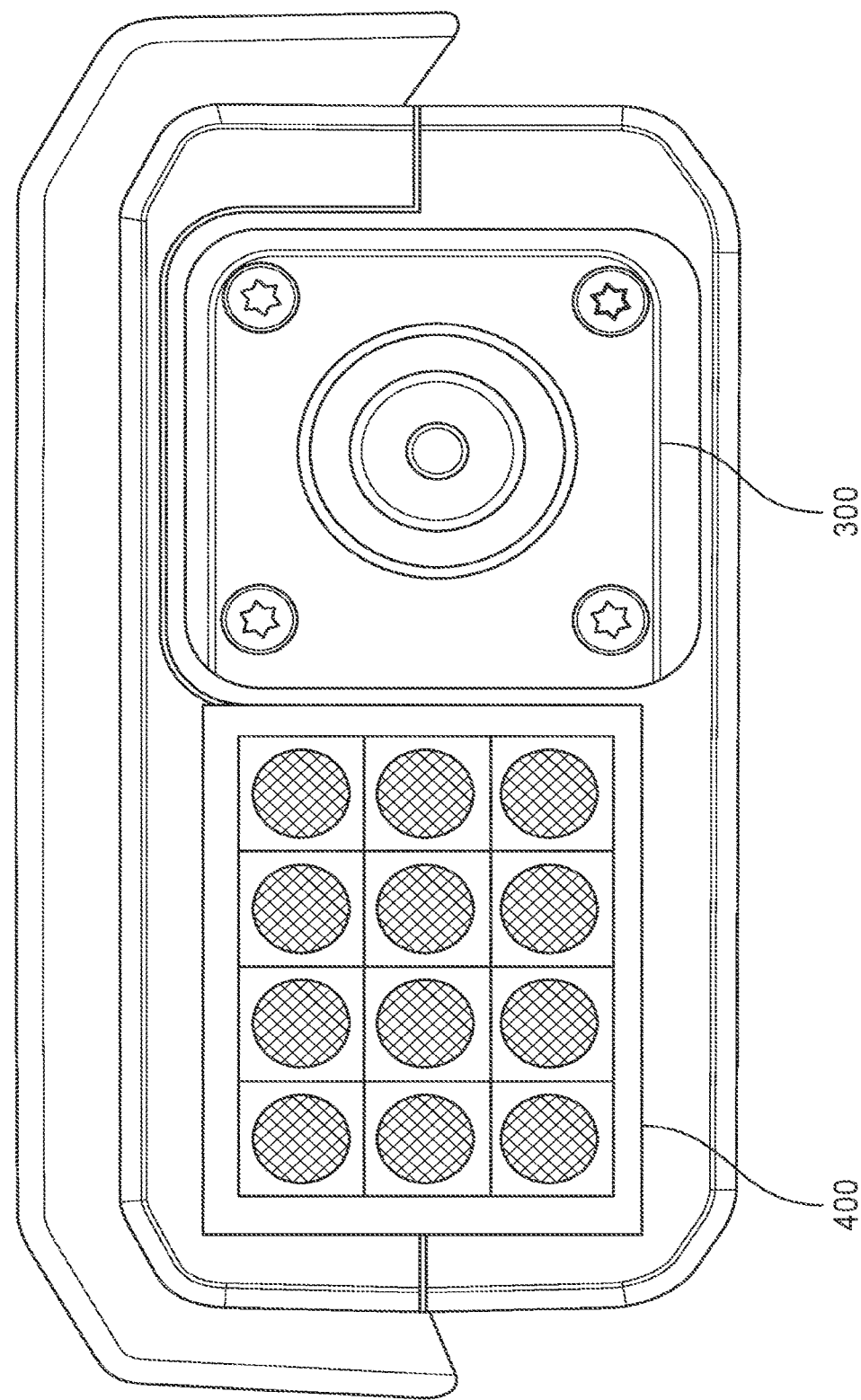

Referring to FIG. 4B and FIG. 4C, the illustrations are of illustrative embodiments of the system for commercial sale and use. Assembly 420 is a configuration of a camera apparatus 300 with a plurality of light emitting apparatuses 400. The assembly 420 may be mounted to the front of a police car to capture images for license plate recognition. The assembly 420 may draw power from the subject vehicle. Although FIG. 4B depicts the components of assembly 420 as a single object, in some examples, the parts of assembly 420 may be separated and installed separately or in an organized, different manner.

Figure 6A:
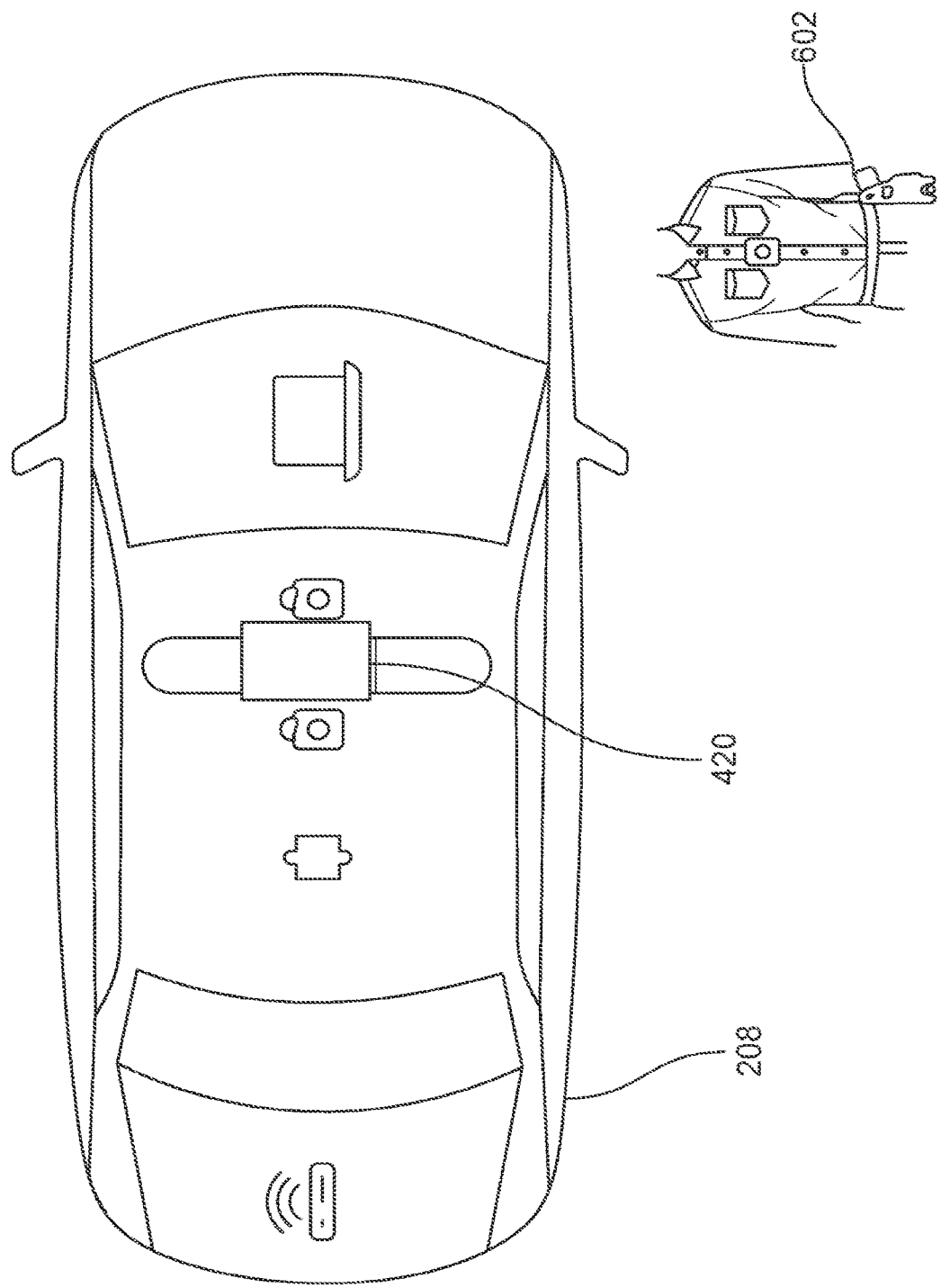
FIG. 6A and FIG. 6B are examples of implementations of the camera assembly in accordance with one or more example embodiments.
Figure 7:
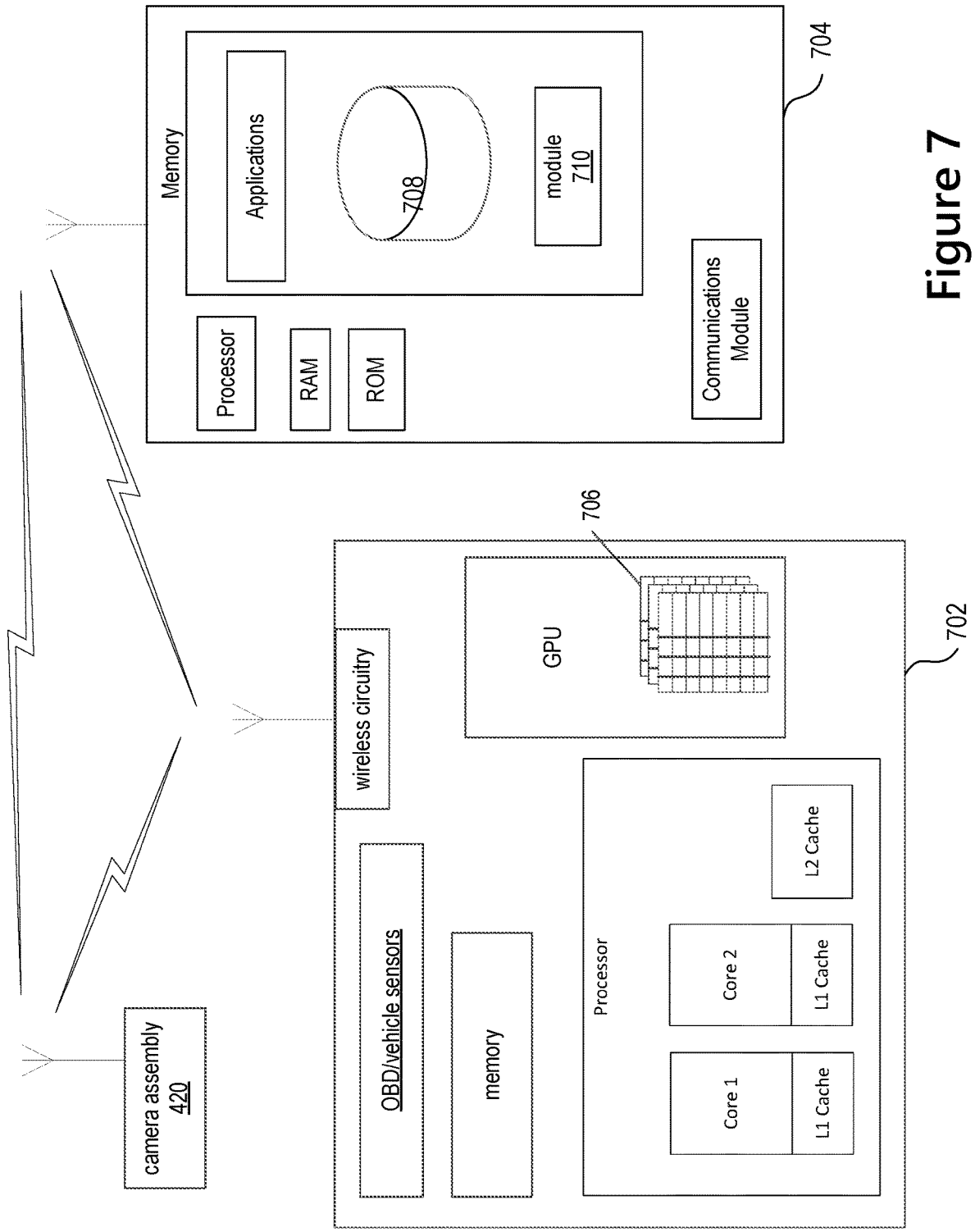
FIG. 7 illustrates an example of a networked environment for implementation of one or more aspects of the disclosure in accordance with one or more example embodiments.

FIG. 4C illustrates one installation of the system where just one light emitting apparatus 400 is combined with the camera apparatus 300. The device may be mounted inside a vehicle, or outside a vehicle. For example, as illustrated in FIG. 6A, the device 420 may be mounted to the top of a police car 208. Moreover, the device may be capable of over-the-air (OTA) software updates to its software and data. The device 420 may also seamlessly connect with a local, wireless network comprising other components in the vehicle 208 and accessories 602 carried by or worn on the operator of the vehicle 208. Moreover, connecting with the local network provides the device 420 with event notifications, such as when the operator opens the car door, activates a police car's light/siren bar, and other events, so the device 420 can react accordingly. Once connected with the local network of devices, the device 420, 702 may connect as illustrated in FIG. 7 with a computing device 704 to assist it with calculations, storage, and other computations.

Figure 6B:
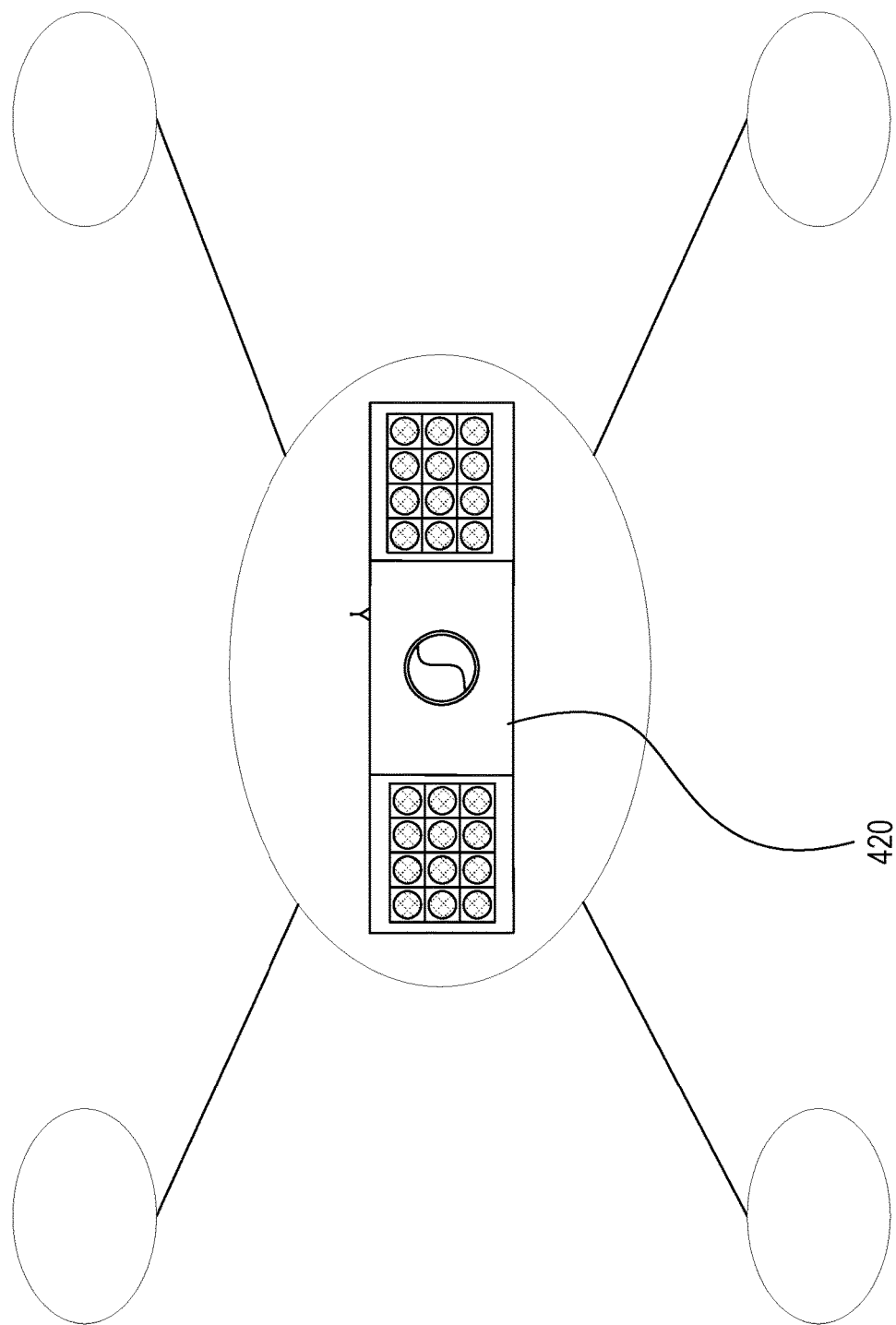

The system is not limited to traditional vehicles. Rather, unmanned aerial vehicles (UAVs) or drones are also considered vehicles for purposes of this disclosure. FIG. 6B illustrates a UAV equipped with the device 420. The installation of the device 420 on a UAV may rely upon components that were optional in a car installation. For example, GPS unit 312 (or comparable location tracking technology) may be critical to a device 420 installed on a UAV because of the UAVs ability to travel outside the confines of traditional lanes on a highway. Moreover, the UAV may optimize the illumination pattern from the device 420 to focus in a downward direction towards the road. The micro-controller 304 and AI component 316 in the device 420 may be used to train the system to optimize the capturing of license plate numbers of vehicles. Finally, in UAV installations, the operations of the camera apparatus 301 may be modified to account for any high-frequency vibrations that might occur from capturing images or video from an UAV. For example, a global shutter feature may be implemented in the camera apparatus 301 to reduce rolling shutter effect that might be caused by vibrations.

Figure 5:
FIG. 5 is a flowchart in accordance with one or more example embodiments.

Regarding FIG. 5, the flowchart illustrates an example of an operation of a light emitting apparatus 400 in accordance with various aspects of the disclosure. In steps 502 and 504, the system measures 502 an approximate distance to a target vehicle in a lane near one on which the subject vehicle is traveling. The approximate distance may be calculated using a radar system as disclosed herein. They system also calculates 504 a relative speed of the target vehicle in the lane relative to a speed of the subject vehicle in its own lane. The relative speed (or the speed delta) may also be calculated using a radar system as disclosed herein. In some examples, these two values are inputted into a micro-controller 404 in the light emitting apparatus 400. Alternatively, the micro-controller 404 may receive raw input and calculate the speed delta value and distance value itself. Alternatively, an external source may calculate these values and provide them to the apparatus 400 through an external interface, such as a physical port or through a wireless antenna.

Next in step 506, the micro-controller 404 may generate a tilt command and/or an illumination command based on the received inputs. The commands may be sent 508 to their respective destinations: the tilt command is sent to the mounting apparatus 402 to effect a change in orientation of the emission of the one or more light sources attached to the light emitting apparatus 400. Meanwhile, the illumination command may be designated with one of several values. See step 510. In one example, the illumination command values may be from the enumerated list of low, medium, or high. Based on the value, the LED light source may emit a low illumination 512, medium illumination 514, or high illumination 516. For example, the micro-controller 404 may send an approximate voltage level to the light source in the light emitting apparatus, corresponding to the low value, medium value, or high value of the illumination command. As a result, the light source may emit a brightness of illumination corresponding to the approximate voltage level. The light emitted by the LED may be in an infrared frequency range and create an asymmetrical illumination pattern towards a lane near to the one on which the vehicle is traveling.

In step 518, in examples where the light emitting apparatus 400 is external to the camera apparatus 301, the light emitting apparatus 400 and the camera apparatus 301 are synchronized by communications with or related to the operational state of each apparatus 301, 400. The apparatuses may communicate directly, or they may communicate with a central mediator or gateway device that controls their operation. As illustrated in FIG. 7, the camera assembly 420, which comprises the light emitting apparatus 400 and the camera apparatus 301, may communication with other devices 702, 704 on the network.

Regarding FIG. 7, in one or more arrangements, teachings of the present disclosure may be implemented with system of networked computing devices. FIG. 7 illustrates that the camera assembly 420 may operate with other networked computing devices 702, 704. In addition to the device shown in FIG. 7, other accessories and devices may be communicatively coupled to the camera assembly 420. For example, an operator (as illustrated in FIG. 6A), such as a law enforcement officer, may be associated with one or more devices 602. The devices may include, but are not limited to, a wearable camera, a weapon 602, and various devices associated with a vehicle 208, such as a vehicle-mounted camera 420. The weapon 602 may be, for example, a conducted energy weapon (CEW) that transmits notifications regarding events such as firing events, cartridge loading, holster removal, and/or the like. Other devices, such as a heart rate sensor device, a holster sensor device, and/or the like may also be included in the system but are not illustrated in FIG. 7.

The system includes an evidence management system 704 having a digital video and audio processing system with an audio watermark processing engine, such as the digital video and audio processing system. The digital video and audio processing system may be configured to receive and process audio watermarks, and may also include a synchronization engine. Some of the devices in FIG. 7 may have limited communication functionality. For example, devices may have short-range wireless communication abilities, but some devices may only be able to perform a direct long-range transmission or reception of information, such as to an evidence management system 704, when physically connected to an evidence collection dock that communicates with the evidence management system 704 via a network such as a LAN, a WAN, and/or the Internet.

In some embodiments, a computing device 702 is provided at the vehicle 208. The computing device 702 may be a laptop computing device, a tablet computing device, or any other suitable computing device capable of performing actions described herein. The computing device 702 may be capable of short-range communication with the devices in the system, and may also be capable of long range communication with the evidence management system 704, a dispatch system, or any other system. In some embodiments, the computing device 702 has the components and capabilities described herein.

Communication between devices 420, 702, 704 may include any conventional technologies (e.g., cellular phone service, text and data messaging, email, voice over IP, push-to-talk, video over cellular, video over IP, and/or the like). Communication may use conventional public or private media (e.g., public cellular phone service, local area service, reserved channels, private trunk service, emergency services radio bands, and/or the like). In some embodiments, the device 702 may be configured to perform computationally intensive operations as an edge computing device, thus reducing the load on and bandwidth to remote device 704.

Computing device 702 may be located in or around a subject vehicle. The computing device 702 may communicate with an on-board diagnostics (OBD) port of the subject vehicle to collect information about speed and other properties of the subject vehicle. In some examples, the device 702 may communicate wirelessly with vehicle sensors positioned in the subject vehicle. The data collected about the subject vehicle may be stored in association with images captured by the camera assembly 420.

Computing device 702 may include a GPU for performing machine learning computations using training data 706 collected by the camera assembly 420 and other camera assemblies mounted on other vehicles. Through the collection of this data, the neural network 800 illustrated in FIG. 8 provides feedback to the system to improve performance.

FIG. 8 illustrates a neural network 800 that may be executed by module 710 in device 704, including providing other artificial intelligence computations. At least one advantage of the module 710 being located in the cloud is that edge-computing resources may be conserved for other computations. Examples of edge-computing resources in the system include component 316 in the camera apparatus 301. For example a AI model may be trained and stored in memory on the camera apparatus 301 to assist the AI component 316 to use a feedback loop to adjust and refine its settings and operation. The AI component 316 may include a GPU for processing machine learning and deep learning calculations with efficiency and speed. For example, the deep learning systems 800 may analyze and categorize video based on its fundamental sensory components: what's visually present (sight) and what's happening across time (motion). Examples of motion include the way objects move across time to derive deeper meaning from the scene. For example, the deep learning can determine if an object is stationary or moving, what direction it's moving, and how the scene evolves around it.

FIG. 8 may further include a prediction subsystem for using model data to train the neural network 800 to predict whether an image will be optimal with particular camera parameter settings and illumination cone pattern settings. It should be noted that, while one or more operations are described herein as being performed by particular components, those operations may, in some embodiments, be performed by other components or by other device in the system. In addition, although some embodiments are described herein with respect to machine learning models, other prediction models (e.g., statistical models or other analytics models) may be used in lieu of or in addition to machine learning models in other embodiments (e.g., a statistical model replacing a machine learning model and a non-statistical model replacing a non-machine-learning model in one or more embodiments). In some embodiments, techniques used by the machine learning models (or other prediction models) include clustering, principal component analysis, nearest neighbors, and other techniques. Training of machine learning models (or other prediction models) may include supervised or unsupervised training.

In some embodiments, a neural network may be trained and utilized for predicting optimal setting configurations. As an example, neural networks may be based on a large collection of neural units (or artificial neurons). In some embodiments, each individual neural unit may have a summation function which combines the values of all its inputs together. In some embodiments, each connection (or the neural unit itself) may have a threshold function such that the signal must surpass the threshold before it is allowed to propagate to other neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from front layers to back layers). In some embodiments, back propagation techniques may be utilized by the neural networks, where forward stimulation is used to reset weights on the "Layer 1" neural units. In some embodiments, stimulation and inhibition for neural networks may be more free-flowing, with connections interacting in a more chaotic and complex fashion.

Referring to FIG. 6A, in some embodiments, the camera apparatus is a mountable camera that provides a point of view associated with the subject vehicle. In some embodiments, the camera apparatus may be modified to be a device carried by the user, such as mounted onto a helmet. In one example (see FIG. 6A), the camera assembly 420 may automatically start, pause, stop, etc. based on events received via a short-range wireless interface with the vehicle sensors of vehicle 208. For example, if a subject vehicle 208 is standing still at rest stop, the vehicle's speed delta may register at a lower value. As such, referring to the scenarios 100 in FIG. 1, the camera apparatus 300 may adjust its settings configuration via the micro-controller to accommodate the environment. Meanwhile, the memory 310 store may also store event information in association with captured images to record conditions at the time of image capture. This information may be useful when auditing data for potential use in an legal proceeding.

Regarding the subject vehicle, it may be a police patrol car, but can be any road or off-road vehicle (or even flying vehicle), including jeeps, trucks, motorcycles, ambulances, buses, recreational vehicles, fire engines, drones, and the like. The target one or more vehicles can likewise be any combination of any types of vehicles, and will be in the proximity of the subject vehicle in any of numerous different placements. Some of the target vehicles will have rear license plates, front license plates, or both front and rear plates.

Regarding mounting locations, one or more cameras may be mounted at the front and/or rear portions of the subject vehicle. Mounting can be on the bumpers or anywhere else, and can even be located in other positions such as in the siren tower on top of the subject vehicle or inside the cab behind the windshield. The one or more cameras can be mounted in the center line of the subject vehicle, or off-center in any suitable manner. The at least one camera provides front, rear, side, and/or a combination of coverage. A second, third, or more other cameras may optionally be included on the subject vehicle. In some embodiments, a plurality of cameras may be mounted on the subject vehicle in suitable locations (e.g., front, rear, side, or top) to allow up to 360 degrees of field of view for image capture. Moreover, the camera assembly may be programmed to operate autonomously in background mode, e.g., without requiring operator input. The camera assembly may, in some embodiments, only alert the operator when the camera assembly has identified a possible safety (or legal-related) concern, for example, using the captured license plate information of neighboring vehicles. The camera assembly may, in some embodiments, operate continuously for an extended period of time while the subject vehicle is patrolling an area, and can be turned on and off by the operator as desired.

In this description herein of the various embodiments, reference is made to the accompanying drawings, which form a part hereof, and in which is shown by way of illustration, various embodiments of the disclosure that may be practiced. It is to be understood that other embodiments may be utilized. A person of ordinary skill in the art after reading the following disclosure will appreciate that the various aspects described herein may be embodied as a computerized method, system, device, or apparatus utilizing one or more computer program products. Accordingly, various aspects of the computerized methods, systems, devices, and apparatuses may take the form of an entirely hardware embodiment, an entirely software embodiment, or an embodiment combining software and hardware aspects. Furthermore, various aspects of the computerized methods, systems, devices, and apparatuses may take the form of a computer program product stored by one or more non-transitory computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space). It is noted that various connections between elements are discussed in the following description. It is noted that these connections are general and, unless specified otherwise, may be direct or indirect, wired or wireless, and that the specification is not intended to be limiting in this respect.

Aspects of the invention have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

The foregoing description discusses preferred embodiments of the present invention, which may be changed or modified without departing from the scope of the present invention as defined in the claims. Examples listed in parentheses may be used in the alternative or in any practical combination. As used in the specification and claims, the words comprising, including, having introduce an open-ended statement of component structures and/or functions. In the specification and claims, the words a and an are used as indefinite articles meaning one or more. When a descriptive phrase includes a series of nouns and/or adjectives, each successive word is intended to modify the entire combination of words preceding it. While for the sake of clarity of description, several specific embodiments of the invention have been described, the scope of the invention is intended to be measured by the claims as set forth below.

What is claimed is:

1. A system mountable to a transportation vehicle, the system comprising:
   a light emitting apparatus configured to emit light, wherein the light emitted by the light emitting apparatus creates an illumination pattern towards a lane near to a lane on which the transportation vehicle travels; and
   a camera apparatus physically separate from the light emitting apparatus, the camera apparatus comprising:
      an image sensor configured to capture an image of a target vehicle traveling on the lane near to the lane on which the transportation vehicle travels, wherein the image is captured in accordance with a field of view of the camera apparatus;
      a memory configured to store the image; and
      a processor configured to access the image from the memory and detect a vehicle license plate number of the target vehicle in the image, wherein:
         a most intensive illumination of the illumination pattern is directed towards an edge of the field of view of the camera apparatus; and
         a reduced illumination of the illumination pattern is directed straight ahead of the field of view of the camera apparatus.

2. The system of claim 1, wherein the illumination pattern comprises an asymmetrical illumination pattern.

3. The system of claim 2, wherein the edge comprises a first edge of the field of view of the camera apparatus and the asymmetrical illumination pattern further comprises a lower illumination directed towards a second edge of the field of view of the camera apparatus, and wherein the asymmetrical illumination pattern results in more light being directed towards the first edge than towards the second edge.

4. The system of claim 1, wherein the edge comprises a first edge of the field of view of the camera apparatus and the most intensive illumination of the illumination pattern is further directed towards a second edge of the field of view of the camera apparatus.

5. The system of claim 4, wherein:
   the first edge of the field of view of the camera apparatus is directed towards a lane on a left-hand side of the transportation vehicle;

the second edge of the field of view of the camera apparatus is directed towards a lane on a right-hand side of the transportation vehicle; and the lane near to the lane on which the transportation vehicle travels comprises the lane on the left-hand side of the transportation vehicle or the lane on the right-hand side of the transportation vehicle.

6. The system of claim 1, wherein the light emitting apparatus comprises a light source comprising a plurality of light emitting diodes configured to emit the light.

7. The system of claim 6, wherein the most intensive illumination is emitted by a subgroup of light emitting diodes of the plurality of light emitting diodes.

8. The system of claim 7, wherein the subgroup of light emitting diodes comprises static, non-moveable light emitting diodes.

9. The system of claim 1, wherein the light emitting apparatus is configured to emit the light in an infrared frequency range.

10. The system of claim 1, wherein the most intensive illumination comprises an illumination cone, and wherein the illumination cone is partially emitted outside the field of view of the camera apparatus.

11. The system of claim 1, wherein:
the camera apparatus comprises a first micro-controller in communication with a second micro-controller of the light emitting apparatus to share information between the light emitting apparatus and the camera apparatus; and
the light emitting apparatus and the camera apparatus operate in a synchronized manner in accordance with the shared information.

12. A method for capturing an image of a target vehicle from a system mounted to a subject vehicle while the subject vehicle is traveling, the method comprising:
emitting, by a light emitting apparatus of the system, light towards a lane near another lane on which the subject vehicle is traveling, wherein an illumination pattern is created by the light emitted by the light emitting apparatus;
capturing, by an image sensor of a camera apparatus of the system, the image of the target vehicle, wherein the light emitting apparatus is external to the camera apparatus;
storing, by a memory of the camera apparatus, the image;
accessing, by a processor of the camera apparatus, the image from the memory; and
detecting, by the processor of the camera apparatus, a vehicle license plate number of the target vehicle in the image, wherein:
a strongest light of the illumination pattern is pointed in a first direction to an edge of a field of view of the camera apparatus by which the image is captured; and
a reduced illumination of the illumination pattern is pointed in a second direction straight ahead of the field of view of the camera apparatus.

13. The method of claim 12, wherein the second direction is directed in front of the subject vehicle.

14. The method of claim 12, wherein the first direction comprises a direction of oncoming traffic relative to the subject vehicle.

15. The method of claim 12, wherein emitting the light comprises emitting the strongest light from static, non-moveable light emitting diodes of a light source of the light emitting apparatus.

16. A system mounted to a transportation vehicle for capturing an image of one or more moving vehicles from the transportation vehicle, the system comprising:
a light emitting apparatus configured to emit light, wherein the light emitted by the light emitting apparatus creates an illumination pattern towards a lane near to a lane in front of the transportation vehicle; and
a camera apparatus physically separate from the light emitting apparatus, the camera apparatus configured to perform operations comprising:
capturing, by an image sensor of the camera apparatus, an image of a target vehicle traveling in the lane near to the lane in front of the transportation vehicle;
storing the image in a memory of the camera apparatus; and
sending the image to a processor of the camera apparatus to detect a vehicle license plate number of the target vehicle in the image; wherein:
a field of view by which the image is captured is pointed in a first direction toward the lane in front of the transportation vehicle;
a first illumination cone of the illumination pattern is pointed in a second direction to an edge of the field of view, the second direction different from the first direction; and
relative to an illumination of the first illumination cone, an illumination of the illumination pattern pointed in the first direction is reduced.

17. The system of claim 16, wherein the transportation vehicle comprises one of a police car or a motorcycle.

18. The system of claim 16, wherein the illumination pattern comprises a second illumination cone pointed in a third direction to another edge of the field of view, the third direction different from the second direction.

19. The system of claim 16, wherein the light emitting apparatus is mounted inside the transportation vehicle.

20. The system of claim 16, wherein the first illumination cone comprises a static light emitting diode illumination cone and the light comprises light emitted in an infrared spectrum range.

* * * * *